July 15, 1969   J. L. HOFF   3,456,061
TEMPERATURE CONTROL FOR ELECTRIC HEATING DEVICES
Filed May 22, 1967

INVENTOR
JAMES L. HOFF
BY
ATTORNEYS.

United States Patent Office 3,456,061
Patented July 15, 1969

3,456,061
TEMPERATURE CONTROL FOR ELECTRIC
HEATING DEVICES
James L. Hoff, Trenton, N.J., assignor to Inductotherm
Linemelt Corp., Rancocas, N.J., a corporation of New
Jersey
Filed May 22, 1967, Ser. No. 640,042
Int. Cl. H05b 5/00, 5/04, 9/06
U.S. Cl. 13—26                                14 Claims

ABSTRACT OF THE DISCLOSURE

Temperature control of electric heating devices, particularly electric furnaces, is achieved by optically sensing the temperature of pouring the metal. High and low temperature sensing devices control timers which control the amount of electrical power applied to the furnace to raise the temperature of the contents or permit it to cool. Control is provided by sensing the presence or absence of repeated pourings within predetermined time intervals.

DISCLOSURE

This invention relates to a temperature control for electric heating devices. More particularly, this invention relates to a temperature control for electric furnaces such as induction furnaces for molten metals.

Electric heating furnaces, such as induction furnaces, are often used for melting and holding metals because of several distinct advantages over furnaces which use other types of heat energy. Among the advantages is the fact that electricity is clean; that is the metals do not pick up products of combustion thereby resulting in such defects as gas porosity. Another advantage of electric furnaces, particularly induction furnaces, is the fact that the heat is generated within the molten metal; that is, the heat results directly from the induced current in the metal itself. This means that it is possible to closely maintain temperature thereby avoiding overshooting the desired temperature and time lags due to the thermal lag in driving the heat through the furnace linings.

To make good advantage of the better control inherent in electric furnaces, it is necessary to know the temperature of the metal in the furnace at any particular time. One method is to use thermocouples which are plunged into the molten metal. However, thermocouples present several disadvantages. Disposable thermocouples allow only instantaneous readings before they are destroyed by the molten metal. Of course the thermocouple can be protected by a refractory tube if an appropriate refractory that will not be penetrated by the molten metal is available. But this solution to the problem fails entirely when furnace temperatures are above 3000° F. since useful temperature limit of most known refractories is between 3000 and 3200° F. Moreover, at these temperatures, the strength of refractories is extremely limited.

Even at lower temperatures, problems are encountered through the use of thermocouples protected by refractory tubes. If short tubes are used, then they must be inserted through a wall below the surface of the metal. If the thermocouple tube leaks or is otherwise penetrated by the molten metal, there is an extreme risk of metal running through the tube and out onto the floor. In most cases, once a molten metal leak starts it is extremely difficult to check the flow. If the flow ever reaches the point where it is heavy, the metal starts to cut the refractory thereby ever increasing the rate of flow. It is not unusual in such cases to lose the entire contents of a furnace.

The obvious countersolution is to use long tubes of refractory to protect the thermocouple and plunge the tube through the surface of the metal. This resolves the problem of a leaking furnace but creates new problems. The tube must be several feet long so that it can be submerged well below the surface of the metal. This is difficult because the specific gravity of the refractory is quite a bit less than that of the molten metal thereby creating a buoyancy effect. Thus, the protective tube of refractory becomes an end-loaded cantilever. It is well known that refractories are extremely weak, particularly at the operating temperatures of electric furnaces, thereby resulting in an extremely high breakage rate for the protective refractory tubes. In one experiment it was found that the life expectancy of a six inch diameter protective tube was about 2 hours.

Another solution to the problem of measuring the temperature of molten metals is to use an optical sensing device such as a pyrometer. However, there are practical limitations upon the use of pyrometers even when they are used in conjunction with monochromators that eliminate the effects of furnace gases and even when the optics are properly designed so that target distance is not particularly critical. The most obvious problem with optical heat sensing devices is that they cannot see through the slag which almost invariably forms on the surface of the metal. Thus, they merely measure the temperature of the slag which most often has an emissivity that is not related to the emissivity of the metal. In addition, the slag always has a certain insulating value which is very difficult to account for. Consequently, the accuracy of optical temperature instruments which sight down onto the top of the metal bath is not very high.

It is a general object of the present invention to provide a solution to the measurement of temperatures in molten metal which is not subject to the foregoing described disadvantages. In general, it is proposed to provide an optical sensing instrument such as a pyrometer which is sighted on the stream of molten metal pouring from the furnace and to use the output of such an instrument to control the temperature of the molten metal in the furnace. By sighting on the stream of pouring molten metal, the leaking and buoyancy problems of thermocouples are not encountered. Moreover, the reading taken by the optical instrument is made on the molten metal itself since there is no slag covering for the pouring stream. In addition, furnace gases do not present any problem to the optical instrument.

Another object of the present invention is to provide a new and unobvious apparatus for measuring and controlling the temperature of molten metals.

Yet another object of the present invention is to provide a new and unobvious method for measuring and controlling the temperature of molten metals.

Other objects will appear hereinafter.

For the purpose of illustrating the invention, there is shown in the drawings a form which is presently preferred; it being understood, however, that this invention is not limited to the precise arrangements and instrumentalities shown.

Figure 1:
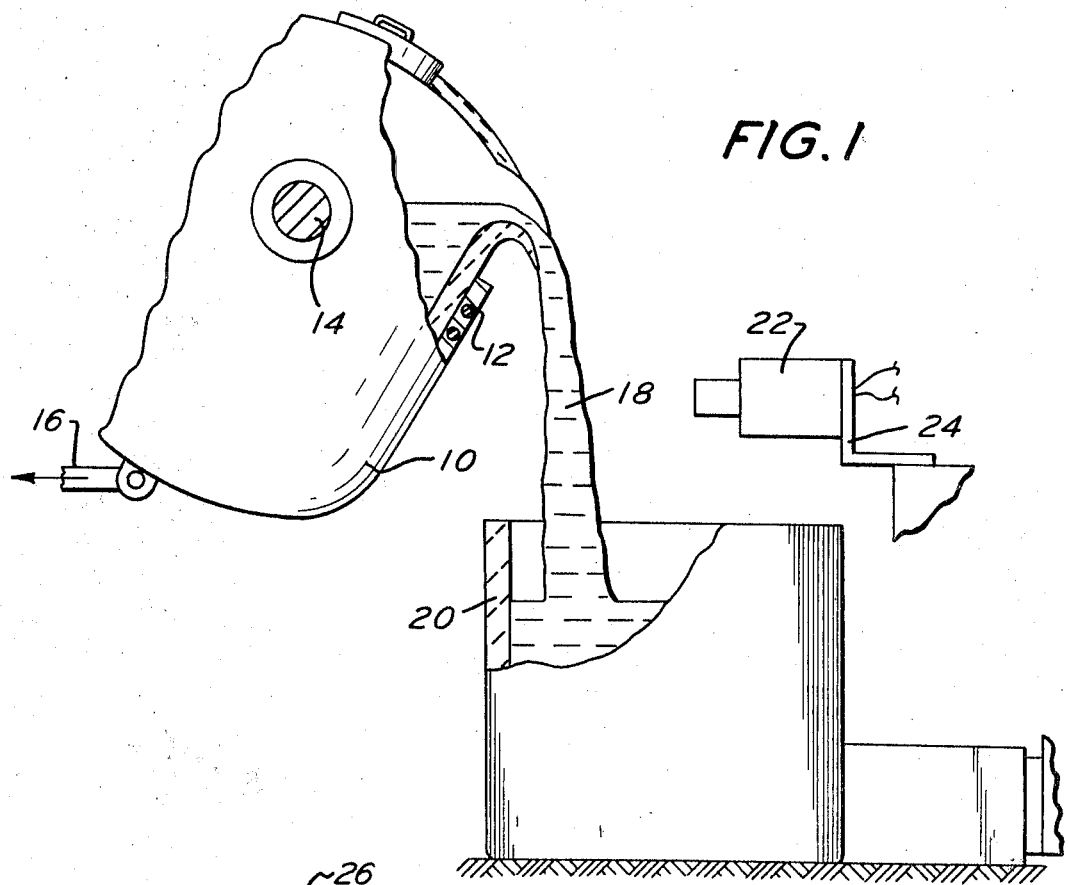
FIGURE 1 is a schematic diagram ilustrating an induction furnace pouring molten metal and the optical pyrometer sensing the temperature of the molten metal being poured.

Referring now to the drawing in detail, wherein like numerals indicate like elements, there is shown in FIGURE 1 an electric furnace designated generally as 10 having an induction coil 12 wound therearound.

As shown, the furnace 10 is supported on a pair of trunnions 14 of which only one is shown. The furnace pivots about the trunnions 14 by the action of the rod 16 pivotally connected to its bottom. The illustration of the furnace 10 in FIGURE 1 is schematic only. It should be understood that the design of the furnace in particular has no part in the present invention. Accordingly, the furnace 10 could be representative of any type of electric furnace which is adapted to pour molten metal at regular intervals.

In FIGURE 1 the furnace 10 is illustrated as a ladle-like device which is pouring molten metal 10 into the crucible 20. The crucible 20 could be any other type of container which is adapted to accept molten metal from the furnace 10 and to further process it.

Positioned adjacent the furnace 10 and the crucible 20 is an optical pyrometer 22 supported on the bracket 24. Pyrometer 22 is positioned so that its optics are sighted on the stream of molten metal 18 pouring from furnace 10 into crucible 20. The pyrometer 22 illustrated in FIGURE 1 is representative of any number of well known, commercially available pyrometers that have been and are used in steel mills and other metal foundries.

For the purposes of this invention, it is assumed that it is desired to accurately sense and maintain temperature of the molten metal contained within the furnace 10. Electrical energy for heating the molten metal within furnace 10 is supplied by a source of power (not shown) connected to the coil 12 in the conventional manner. The temperature of the molten metal is directly related to the amount of electrical energy supplied by coil 12 for conversion into heat. Thus, by controlling the application of electrical energy from the source to the coil 12, the temperature of the molten metal is effectively controlled.

In accordance with the present invention, the temperature of the molten metal within the furnace 10 is measured by determining the temperature of molten metal pouring from the furnace. Obviously the furnace cannot be continually poured or it would soon be emptied of its contents. It has been determined, however, that it is not necessary to continuously know the temperature within the furnace. Instead, knowledge of the temperature at regular intervals is sufficient. Accordingly, the present invention includes a control system which is responsive to the pouring of molten metal from the furnace 10 at regular intervals. In accordance with the temperature so sensed the system applies power to the coil 12 in amount that either raise the temperature of the molten metal or permit it to fall.

More specifically, the control system of the present invention measures the temperature of the metal being poured from the furnace 10 with the optical pyrometer 22. A signal from the pyrometer operates one of two contacts depending upon the temperature sensed. These contacts are connected to timers that are connected in such a way that so long as the furnace pours metal at some regular interval, the timer senses this regularity and initiates other control operations. If the pouring stops, then the timer senses this and initiates another control operation. The operation of this type of control system is described in detail below.

Figure 2:
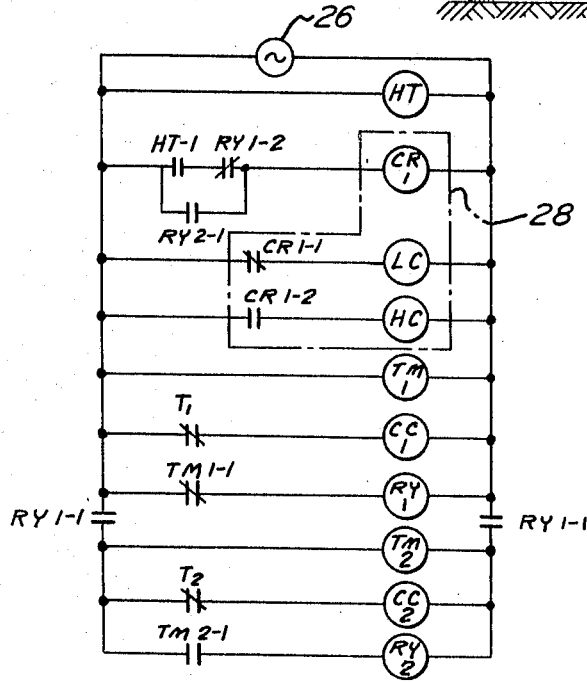
FIGURE 2 is a schematic diagram of a control circuit for use at the system of FIGURE 1.

The control circuit schematically illustrated in FIGURE 2 includes a number of timers, relays and their contacts. Power for operating the circuit is supplied by the source of alternating current 26 which for purposes of illustration may be a 110 volt commercial source. The source 26 supplies alternating current to the circuit elements located within the area defined by the dotted line 28. This includes the control relay CR1 and associated contacts CR1–1 and CR1–2. Contact CR1–1 is normally closed and contact CR1–2 is normally open. Also included within the dotted line are the low power contactor LC and the high power contactor HC. Contactors LC and HC close circuits between the coil 12 and its source of electrical energy to control the current to flow. In accordance with the circuit diagram of FIGURE 2, contactors LC and HC operate alternately since relay contacts CR1–1 and CR1–2 are never open or closed at the same time. When relay CR1 is de-energized, low power contactor LC is therefore energized through normally closed contact CR1–1. Low power contactor LC will close an appropriate contact (not shown) to supply electrical energy to coil 12 in an amount that does not maintain the operating temperature of the molten metal. Upon energization of contact relay CR1, contacts CR1–1 opens and contact CR1–2 closes. High power contactor HC is then energized to thereby supply additional electrical power to coil 12 in an amount that will be sufficient to raise the temperature of the molten metal 18 and to maintain it at operating temperatures.

The elements within the dotted line 28 are normally provided with an electric furnace, together with the holding cycle timer HT and its contact HT–1. The holding cycle timer HT is connected across the source 26 and controls contacts HT–1 which are held closed for a predetermined period of time and then held open for a predetermined period of time. Cycle timer HT continuously operates so that contact HT–1 is continuously opening and closing in accordance with the times adjusted into the timer HT.

As thus connected in series with the normally closed relay contact RY1–2, the opening and closing of contact HT–1 will control the energization of control relay CR1. When contacts HT–1 are closed, control relay CR1 is energized thereby closing contacts CR1–2 and opening contacts CR1–1 to energize high power contactor HC. When contact HT–1 is open, control relay CR1 is de-energized and hence the furnace is put on lower power by the energization of low power contactor LC. In this type of operation, the furnace is supplied with sufficient power to maintain temperature at such a level that the loss of energy due to conduction and radiation is equal to the energy supplied. In other words the furnace is supplied with holding power. However, this timer has no way of adjusting the power level to suit the work load.

Timer TM1 is connected across source 26 so that its motor is continuously energized. Timer TM1 controls the normally closed contact TM1–1 which is connected in series with relay coil RY1 across source 26. Timer TM1 also includes an electrically operated clutch coil CC1 which is used to reset the timer TM1. Clutch coil CC1 is connected in series with low temperature contact $T_1$ across the source 26.

Contact $T_1$, which is normally closed, is the low temperature contact of the control system; that is low temperature contact $T_1$ is connected to the pyrometer in such a manner that it will open when the temperature sensed is above a predetermined amount, such as the melting point of the metal, and it will remain open at all higher temperatures. Below the specified temperature, it is closed as shown in the schematic.

When contact $T_1$ is closed, the clutch coil CC1 is energized and timer TM1 starts to time out. At the end of its timing cycle, the timer TM1 will open normally closed contact TM1–1. Clearly then, if the timer TM1 can be prevented from timing out, contact TM1–1 remains closed and relay coil RY1 is always excited. Excitation of relay coil RY1 closes contacts RY1–1 and opens contact RY1–2.

Based upon the foregoing described operation, it is obvious that if the molten metal within furnace 10 is poured at regular intervals, or at least often enough to prevent the timer TM1 from timing out, relay contacts RY1–1 remains closed and contact RY1–2 remains open.

Timer TM2 is connected directly across source 26 and remains energized so long as relay contacts RY1–1 are closed. Timer TM2 includes contact TM2–1 which is connected in series with relay coil RY2 across the source 26. Timer TM2 controls contact TM2–1 so that it closes the contact when it times out thereby energizing relay RY2.

Energization of relay RY2 at any time closes contact RY2–1 to energize control relay CR1 thereby putting the furance on high power. Thus, any time that timer TM2 times out, the furnace goes on high power.

Timer TM2 can be prevented from timing out by deactivating clutch coil CC2 which is connected in series with high temperature contact $T_2$ across source 26. High temperature contact $T_2$ is connected to the pyrometer 22 and is set at a temperature desired in the metal. As long as the metal is below this temperature sensed by pyrometer 22, contact $T_2$ remains closed and thereby energizes clutch coil 2. Energization of clutch coil 2 permits timer TM2 to engage its motor and to time out thereby closing relay contact RY2–1 and placing the furnace on high power. This raises the temperature of the metal until it becomes sufficiently hot on some particular pour that the temperature sensed by pyrometer 22 is above that set into the instrument thereby opening contact $T_2$ and deactivating clutch coil 2.

The deactivation of clutch coil 2 resets timer TM2 and hence it never closes contact TM2–1. Accordingly, the furnace remains on low power and the temperature begins to fall.

As long as the furnace is poured at intervals such as to prevent timer TM1 from timing out, relay RY1 is energized which opens contact RY1–2, thus preventing holding cycle timer HT from causing the furnace to go on high power. Thus the application of high power can only be effected by timer TM2 and relay RY2, which is, in turn, dependent upon the temperature of the metal sensed by contact $T_2$.

The system of temperature control for the furnace 10 must be apparent from the foregoing. The following are examples of such operation:

It is assumed that the furnace 10 is in operation and now contains a batch of molten metal. Accordingly, holding timer HT is in operation, and the furnace is cycling between high and low power as controlled by the setting of the holding timer HT. It is further assumed that the molten metal is about to be poured into the crucible 20. For purposes of giving a starting point at which to describe the operation, it is also assumed that the metal is below the desired operating temperature.

At this point, the furnace 10 is poured. Accordingly, the pyrometer 22 which is sighted on the molten stream 18 will sense the temperature and low temperature contact $T_1$ will open since the metal is molten. Contact $T_2$ will not open because the metal is relatively cold; that is, it is below the desired operating temperature. By opening low temperature contact $T_1$, the clutch coil CC–1 is de-energized thereby resetting timer TM1. Since contact TM1–1 is closed, relay RY1 is energized and contacts RY1–1 are closed and contact RY1–2 is opened. Timer TM2 is running. Since high temperature contact $T_2$ is closed, clutch coil CC2 is energized thereby causing it to engage timer TM2 which begins to time. When the pour ends, pyrometer 22 will no longer supply a signal to low temperature contact $T_1$, and it will close. Therefore, clutch coil CC1 will be energized and engage timer TM1 which begins to time out. Relay RY1 remains excited and timer TM2 continues to time.

Now a second pour is made. Low temperature contactor again opens thereby de-energizing clutch coil 1 and permitting timer TM1 to reset. Timer contact TM1–1 remains closed and hence relay RY1 continues to be energized and holds contact RY1–1 closed. Consequently timer TM2 continues to run. High temperature contact $T_2$ is still closed since the metal is below the operating temperature. Clutch coil CC2 is excited thereby causing timer TM2 to continue to time out. During the second pour or a subsequent pour, timer TM2 will time out. This closes timer contact TM2–1 thereby exciting relay RY2 and closing contact RY2–1. This puts the furnace on high power by energizing contact relay CR1 and opening and closing contacts CR1–1 and CR1–2, respectively.

If at any time pouring ceases, low temperature contact $T_1$ will close, thereby again exciting clutch coil CC1, and timer TM1 will time out. When this happens, timer contact TM1–1 opens and relay coil RY1 is de-energized thereby opening contact RY1–1. Timer TM2 is de-energized as well as clutch coil CC2 and relay RY2. Therefore, the furnace is put back under the control of holding timer HT.

From the foregoing, it should be apparent that once a pour is made, timer TM1 will reset and start to time on each successive pour. As long as the pours are continued, timer TM1 never times out. However, when successive pourings cease, timer TM1 is allowed to time out and in so timing out de-energizes timer TM2. Timer TM2 places the furnace on high power only if it is allowed to time out, and this can happen only if timer TM1 is prevented from timing out.

High temperature contact $T_2$ does not open until the operating temperature of the furnace is reached. At this point, clutch coil CC2 is de-energized and timer TM2 is reset. Therefore, the furnace will go back under the control of the holding timer HT and timer TM1 until such time that upon a particular pour it is detected that the temperature has dropped below the desired operating temperature. Then contact $T_2$ will close and timer TM2 begins to time out.

The foregoing system works best when applied to a furnace that pours frequently, and where the furnace is quite large with a high thermal mass. However, it is applicable to small furnaces by proper adjustment of timing periods. It should be noted that for proper operation of the system in accordance with the sequence set forth above, the timing cycle of timer TM2 should be somewhat longer than the timing cycle of timer TM1.

The present invention may be embodied in other specific forms without departing from the spirit or essential attributes thereof and, accordingly, reference should be made to the appended claims, rather than to the foregoing specification as indicating the scope of the invention.

I claim:

1. A temperature control for a furnace comprising temperature sensing means positioned to sense the temperature of molten metal being poured from the furnace, control means for the furnace source of heat energy, said control means including means to adjust the rate at which the energy is applied to the molten metal in the furnace, and means responsive to the temperature sensed by said sensing means for effecting a variation in the rate of application of the energy through said adjustment means.

2. A temperature control in accordance with claim 1 wherein said temperature sensing means includes a pyrometer and optical means sighted on the stream of molten metal being poured from said furnace.

3. A temperature control for an electric furnace comprising temperature sensing means positioned to sense the temperature of molten metal being poured from the furnace, control means for the furnace including means to adjust the rate at which electrical energy is supplied to the molten metal in the furnace, and temperature responsive means responsive to the temperature sensed by the sensing means for effecting a change in the rate of application of electrical energy by said adjustment means, said temperature responsive means including a first control and a second temperature sensitive control, said second temperature sensitive control including temperature sensitive means, said first control being connected to control said second temperature sensitive control, said second temperature sensitive control including means to connect said adjustment means for effecting a variation of the rate in accordance with the temperature sensed in a pouring stream of metal.

4. A temperature control for an electric furnace comprising temperature sensing means positioned to sense the temperature of molten metal being poured from the furnace, control means for the furnace source of electrical energy, said control means including a low temperature sensor, a first timer responsive to said low temperature sensor, a high temperature sensor, a second timer responsive to said high temperature sensor, means including said low temperature sensor to reset and restart said first timer prior to said timer timing out, said first timer including means for controlling said second timer, said means for controlling said second timer including means to energize said second timer only while said first timer is timing out, adjustment means for adjusting the rate at which electrical energy is applied to said furnace, and means for initiating adjustment including said second timer.

5. A temperature control for an electric furnace in accordance with claim 4 wherein said temperature sensing means includes a pyrometer having optical means sighted on any stream of molten metal being poured from the furnace.

6. A temperature control for an electric furnace comprising temeprature sensing means including an optical pyrometer, said optical pyrometer being positioned to sight on a stream of molten metal being intermittently poured from a molten metal furnace, control means for the furnace source of electrical energy including switch means for selectively connecting the furnace between a high power source of electrical energy and a low power source of electrical energy, a first temperature sensor connected to said pyrometer and set to operate at a first preset temperature, a second temperature sensor connected to said pyrometer and set to operate at a second preset temperature, said second preset temperature being above said first preset temperature, a first timer, said first timer being operative only in response to the operation of said first temperature sensor, a second timer, said second timer being responsive to said second temperature sensor, said second timer including means for connecting it to said control means for the furnace source of electrical energy for initiating said switch means.

7. A temperature control for an electric furnace in accordance with claim 3 wherein said first control includes temperature sensitive means and said first control is responsive to a lower temperature than said second temperature sensitive control.

8. A temperature control for an electric furnace in accordance with claim 3 wherein said first control includes means to control energization of said second temperature sensitive control above a preset temperature sensed by said temperature sensing means.

9. A temperature control for an electric furnace in accordance with claim 3 wherein said second temperature sensitive control includes means to control adjustment of the rate according to whether the temperature sensed is above or below a preset temperature.

10. A temperature control for an electric furnace in accordance with claim 3 wherein said first control includes timing means, and reset means for restarting the timing period of said timing means on each successive pour of the furnace.

11. A temperature control for an electric furnace in accordance with claim 3 wherein said second temperature sensitive control includes timing means, and reset means for restarting the timing period of said timing means when the temperature sensed during a furnace pour is above a predetermined amount.

12. A temperature control for an electric furnace in accordance with claim 10 wherein said first control controls said second temperature sensitive control by means to open an electrical circuit between the second temperature sensitive control and a source of energy at the end of a timing period.

13. A temperature control in accordance with claim 12 wherein said second temperature sensitive control includes second timing means, and said second temperature sensitive control effects variation in said rate by means for closing an electrical circuit between a source of electrical energy and an electrically responsive switch in said adjustment means at the end of the timing period of said second timing means, said adjustment means including means for switching said furnace to a different rate.

14. A temperature control for an electric furnace comprising temperature sensing means including an optical pyrometer, said optical pyrometer positioned to sight a stream of molten metal being intermittently poured from a molten metal furnace, control means for the furnace source of electrical energy including switch means for selectively connecting the furnace between a high power source of electrical energy and a low power source of electrical energy, a first temperature sensitive contact, said first temperature sensitive contact being connected to said pyrometer and set to open below a first preset temperature and close above said first preset temperature, a second temperature sensitive contact connected to said pyrometer and set to close below a second preset temperature and open above said second preset temperature, said second preset temperature being above said first preset temperature, a first timer, said first timer including means for controlling a normally closed first timer contact by opening said normally closed first timer contact at the conclusion of a timing period, said first timer including means making it operative to time out only when said first temperature sensitive contact is closed, a second timer, said second timer including means controlling a normally open second timer contact by closing said normally open second timer contact at the conclusion of a timing period, said second timer including means making it operative to time out only when said second temperature sensitive contact is closed, contact means for connecting said second timer to a source of electrical energy, first electrically responsive means to close said contact means, said first electrically responsive means being connected to a source of electrical energy through said normally closed first timer contact, second electrically responsive means to control said switch means, said second electrically responsive means being connected to a source of electrical energy through said normally open contact.

References Cited

UNITED STATES PATENTS

| | | | |
|---|---|---|---|
| 1,884,637 | 10/1932 | Peehan | 13—26 |
| 2,448,008 | 8/1948 | Baker | 219—10.77 X |
| 2,459,616 | 1/1949 | Burgwin | 219—10.77 X |
| 2,724,037 | 11/1955 | Bock | 219—10.77 |
| 2,916,593 | 12/1959 | Herrick | 219—10.77 X |
| 3,347,972 | 10/1967 | Renkey | 13—26 X |

JOSEPH V. TRUHE, Primary Examiner

L. H. BENDER, Assistant Examiner

U.S. Cl. X.R.

219—10.77